A. WYNNE.
CORN PLANTER ATTACHMENT.
APPLICATION FILED NOV. 17, 1915.
1,195,890.
Patented Aug. 22, 1916.
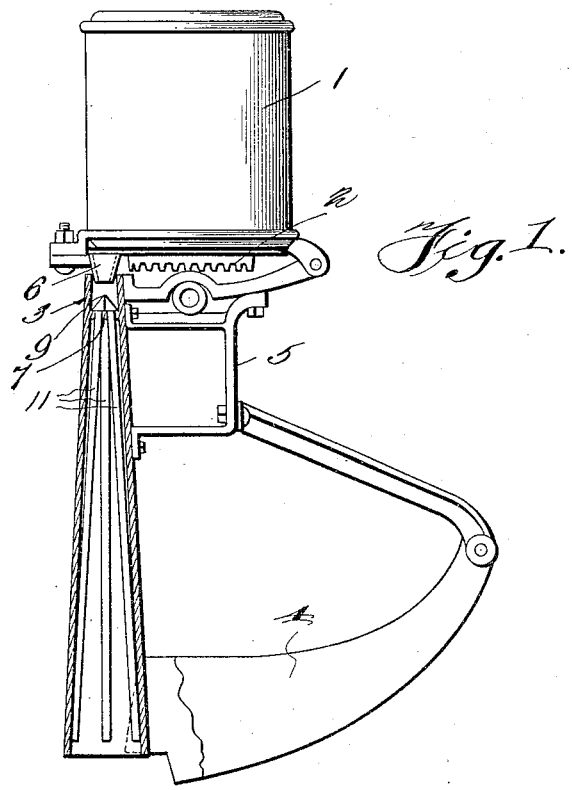
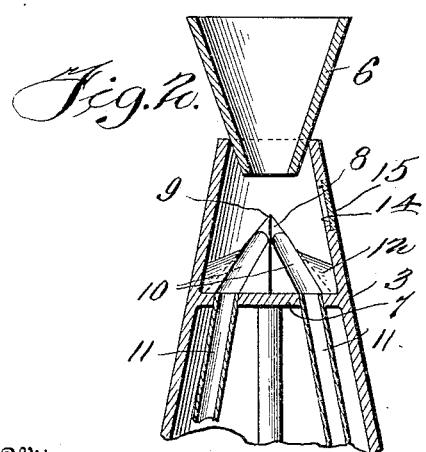
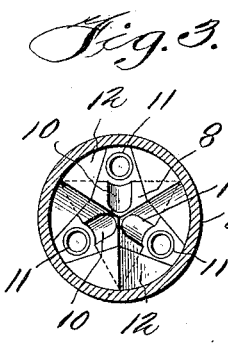
Inventor
Alexander Wynne,

UNITED STATES PATENT OFFICE.

ALEXANDER WYNNE, OF METROPOLIS, ILLINOIS, ASSIGNOR OF ONE-HALF TO ABRAHAM BAKER, OF TEMPLE HILL, ILLINOIS.

CORN-PLANTER ATTACHMENT.

1,195,890.  Specification of Letters Patent.  Patented Aug. 22, 1916.

Application filed November 17, 1915. Serial No. 62,001.

*To all whom it may concern:*

Be it known that I, ALEXANDER WYNNE, a citizen of the United States, residing at Metropolis, in the county of Massac and State of Illinois, have invented certain new and useful Improvements in Corn-Planter Attachments; and I do hereby declare the following to be a full, clear, and exact description of the invention, such as will enable others skilled in the art to which it appertains to make and use the same.

This invention relates to an attachment for corn planters, and more particularly to a novel form of delivery spout or hose which delivers the kernels from the hopper and dropping plate into the hill, which delivery spout includes means for dropping the kernels separately, eliminating the bunching of the kernels of corn in the hill and permitting each kernel or grain to grow without having its roots becoming entwined and tangled with the roots of another kernel, thereby increasing the chances of each kernel growing and maturing to the limit of its ability.

Another object of this invention is to provide, in a delivery spout, a dividing block which deflects the kernels of corn upon deposit within the spout from the seed dropping plate, causing the grains to separate and travel downwardly through separate hose or conduit for deposit in the hill.

With the foregoing and other objects in view this invention consists in such novel features of construction, combination and arrangement of parts as will be hereinafter more fully described, illustrated in the accompanying drawing, and claimed.

In describing the invention in detail reference will be had to the accompanying drawing wherein like characters designate like and corresponding parts throughout the several views, and in which:

Figure 1 is a fragmentary side elevation of a corn planter, showing the improved delivery spout attached thereto, the spout being shown in section, Fig. 2 is a sectional view of the upper end of the delivery spout, showing the deflector positioned therein, and Fig. 3 is a cross sectional view through the delivery spout, showing the deflector in plan.

Referring more particularly to the drawing, 1 designates the grain or kernel retaining hopper of an ordinary corn planter, and 2 designates the seed dispensing mechanism, by means of which a predetermined number of kernels are deposited or dropped from the hopper 1 into the delivery spout, generically indicated by the numeral 3, for delivery into a hill or furrow formed by the furrow opening shoe 4. The spout 3, may be attached to the supporting framework 5 of the corn planter in any suitable manner, and it has the lower or delivery end of the kernel buncher 6 communicating with its upper end. The buncher 6 receives the grain from the dropping plate or mechanism 2 and guides it downwardly into the upper end of the delivery spout 3. The delivery spout 3, has a web 7 positioned therein and extending horizontally across the spout a comparatively short distance below its upper end. A deflector 8 rests upon the upper surface of the web 7 and is pyramidal in shape, having its apex 9 positioned directly beneath the central portion of the lower end of the buncher 6 so that the kernels falling through the buncher will strike the inclined sides of the pyramidal deflector 8. Each of the sides of the pyramidal deflector 8 is provided with a groove, as is shown at 10, for guiding the kernels of corn downwardly along the inclined sides of the pyramidal deflector into the upper end of conduits 11. The conduits 11 have their upper ends extending through the web 7 and communicating with the lower ends of the grooves 10. The conduits 11 extend downwardly within the spout 3 to a short distance above the lower end of the same for depositing the kernels separately or in spaced relation to each other in the hill or furrow formed by the furrow opener 4. Deflecting blocks 12 are positioned within the spout 3 and fit over the corners of the pyramidal deflector 8 for preventing the kernels of corn from lodging in the corners or space within the spout 3 about the deflector 8. The blocks 12 have inclined sides so that in case the kernels fail to travel downwardly through the grooves 10 they will be guided into the conduits 11 by the blocks 12. An opening 14 is formed in the spout 3 a short distance below its upper end and it has a transparent channel positioned therein, so that, if it is desired, the person operating the planter can see the kernels of corn falling from the buncher 6 upon the apex of the pyramidal separator or deflector 8.

In reducing the invention to practice, certain minor features of construction, combination and arrangement of parts may necessitate alterations to which the patentee is entitled, provided such alterations are comprehended within the scope of what is claimed.

What I claim is:

1. The combination with an ordinary corn planter including a grain hopper and dropping mechanism, of a delivery spout adapted for receiving the grain from said dropping mechanism and conveying it to a furrow, a web formed horizontally within said spout adjacent its upper end, a plurality of conduits extending longitudinally within said spout and having their upper ends supported by and extending through said web, a pyramidal deflector resting upon said web, said pyramidal deflector having a plurality of grooves formed in its inclined sides, said grooves communicating with the upper open ends of said conduits for guiding kernels of corn into the conduit for separate deposit into a furrow.

2. The combination with an ordinary corn planter including a grain hopper and dropping mechanism, of a delivery spout adapted for receiving the grain from said dropping mechanism and conveying it to a furrow, a web formed horizontally within said spout adjacent its upper end, a plurality of conduits extending longitudinally within said spout and having their upper ends supported by and extending through said web, a pyramidal deflector resting upon said web, said pyramidal deflector having a plurality of grooves formed in the inclined sides, said grooves communicating with the upper open ends of said conduits for guiding kernels of corn into the conduit for separate deposit into a furrow, and deflecting blocks positioned within said spout and in the corners formed by said pyramidal deflector for guiding stray grain kernels of corn into said conduit.

In testimony whereof I affix my signature in presence of two witnesses.

ALEXANDER WYNNE.

Witnesses:
A. BAKER,
IDA YATES.